United States Patent [19]
Gatel

[11] 3,763,485
[45] Oct. 2, 1973

[54] ELECTRIC CONTROL SYSTEM
[75] Inventor: Gilbert Gatel, Grenoble, France
[73] Assignee: Societe Generale De Constructions Electriques et Mecaniques (Alstham), Paris, France
[22] Filed: Mar. 27, 1972
[21] Appl. No.: 238,335

[30] Foreign Application Priority Data
Mar. 26, 1971 France..........................7110853

[52] U.S. Cl. ........................................ 340/347 AD
[51] Int. Cl. ............................................ H03k 13/20
[58] Field of Search ........................... 340/347 AD; 324/99 D

[56] References Cited
UNITED STATES PATENTS
3,521,269  7/1970  Brooks et al. ................ 340/347 AD Primary Examiner—Charles D. Miller
Attorney—Paul M. Craig, Jr. et al.

[57] ABSTRACT

An electric control system in which a control signal is compared with a regulation signal to determine the polarity of the magnitude difference provided as a first signal, a bi-directional counter receiving a frequency signal and providing a digital output, a converter providing said regulation signal in response to said digital output and a generator providing said frequency signal in response to said first signal and a sum of said control signal and said regulation signal.

7 Claims, 4 Drawing Figures

Patented Oct. 2, 1973 3,763,485

ELECTRIC CONTROL SYSTEM

The present invention relates to an electric control system in which one quantity is controlled by an instruction or regulation quantity, such that this instruction or regulation quantity is compared with an image of the controlled quantity and from the comparison of these two informations or data there results the emission of an order for the regulation of the controlled quantity in electrical form. The present invention is applicable more particularly to the case where this order for the regulation is composed of a first signal defining the polarity of the magnitude difference between the two informations or data and of a second signal consisting of a series of pulses furnished by a pulse generator.

These pulses arrive, for example, at a bi-directional counter which receives an order for either counting or subtracting pulses, depending upon the polarity given by the first signal. Such a provision is notably that of an analog digital converter equipped with a return loop which applies on the input of the converter an analog image information of the numerical value obtained at the output of the converter.

In order to increase the rapidity in the response of the electric control system, it is possible to have the pulses emitted by a voltage-frequency converter receiving a voltage which is representative of the magnitude of the difference between said two informations.

It is also necessary to provide a dead zone which corresponds to a small value of the spacing or interval and in which the second signal must not act upon the dependent or controlled quantity.

It has been found according to the present invention that it was possible to satisfy and respond to these requirements by means of a circuit which can be realized in a simple manner and comprises a reduced number of precision components.

For this purpose, the present invention provides an electric control system in which one quantity is controlled by or dependent upon an instruction or regulation quantity, and in which the order for the regulation or operation of the controlled or dependent quantity consists of a first signal defining the polarity of the magnitude difference the instruction or regulation quantity and a quantity representative of the controlled or dependent quantity, and of a second signal constituted of the output pulses of a voltage-frequency converter comprising an amplifier with an elevated amplification whose input receives an image voltage of the magnitude of the difference, and whose output comprises pulses at a frequency linked to the spacing voltage, characterized in that this amplifier having a large amplification factor has a first capacitor connected between the negative input thereof and ground, a second capacitor placed in a negative feedback loop and a potentiometer placed within a positive feedback loop with a third capacitor connected in parallel and playing the role of a filter.

It has further been found that it was possible to assure the starting of the voltage frequency converter by simply inserting into the negative feedback loop a resistor having a high value in parallel at least with the aforementioned second capacitor.

The magnitude of the difference may enter into the voltage frequency converter in the form of an image voltage of the absolute value of the difference. But it has been found that one could avoid the elaboration of this absolute value by causing an image voltage to arrive on the amplifier of this converter, in the same quantity and sign, of the magnitude difference, by installing two negative feedback loops, one appropriate to one polarity of the difference, and the other suitable for the other polarity of the difference, by putting in circuit, according to the respective case, either one or the other of these negative feedback loops and installing at the output of the voltage frequency converter a logic device controlled by the first signal which allows the pulses being emitted by the voltage frequency converter to pass, without modifying the same, if the difference is in one polarity, and inverts the same if the spacing is in the other polarity.

With reference to the accompanying schematic illustrations, one embodiment of the present invention for the case of an analog digital converter will now be further described hereinafter in a non-limiting manner.

Figure 1:
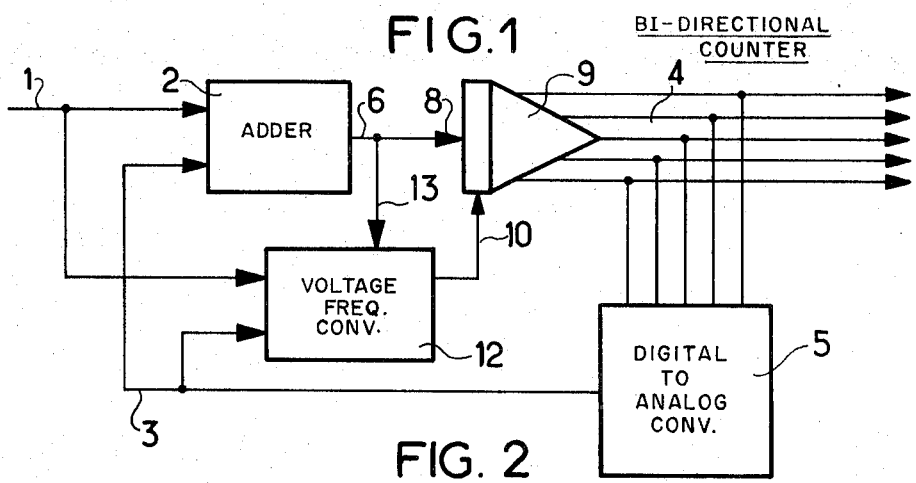
FIG. 1 is a basic block diagram of the subassembly of an analog digital converter.

In FIG. 1 analog input information 1 is added in an adder 2 to analog information 3, representative of the numerical quantity in digital form on the outputs 4 of a bi-directional counter 9, which analog signal 3 is obtained by means of a digital-to-analog converter 5. The adder 2 produces at the output 6 thereof the polarity of the difference between the two analog values 1 and 3. The signal which is collected at output 6 is fed to the input 8 of the bi-directional counter 9 for purposes of imparting to the latter an order for either adding or subtracting impulses furnished at output 10 by a voltage-frequency converter 12. The digital-to-analog converter 5 may be, for example one having a stochastic representation, or one producing a modulation of the width of the pulses.

The voltage frequency converter 12 receives directly, due to the addition of the data 1 and 3, an image signal corresponding to the quantity and sign of the difference. In order to be able to operate in response to this signal, this converter is equipped, as shown in FIG. 2, with two negative feedback loops which are switched in dependence upon the polarity of the difference by the sign of the difference provided at output 6 of the adder 2 and arriving at input 13 of the voltage frequency converter 12.

Figure 2:
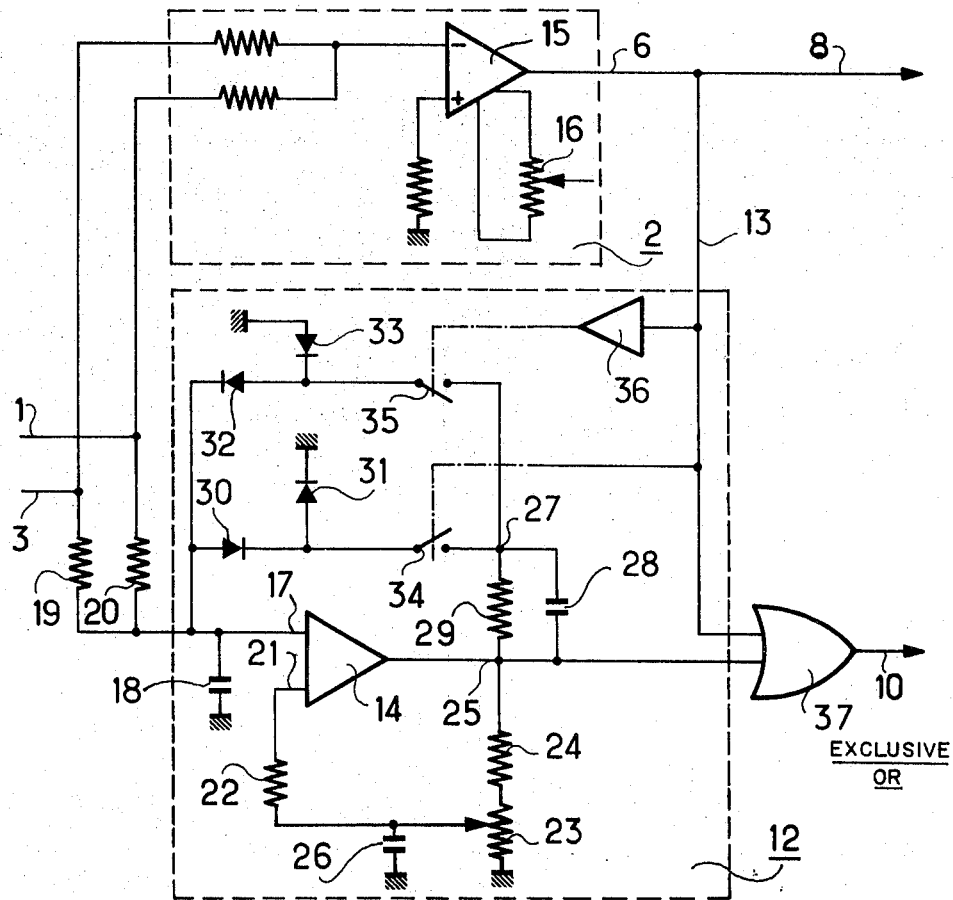
FIG. 2 is a schematic circuit diagram of a portion of the converter of FIG. 1, and FIGS. 3 and 4 are operating waveform diagrams relating to the circuits of FIGS. 1 and 2.

In the diagram of FIG. 2, the information or data 1 and 3 are applied to the inputs of two amplifiers. The amplifier 14 of the converter 12 receives the data 1 and 3 via resistors 19 and 20 at its negative input 17 and an amplifier 15 having a large amplification factor receives the data 1 and 3 via respective resistors and produces at its output 6 an information signal indicating the polarity of the difference.

Figure 3:
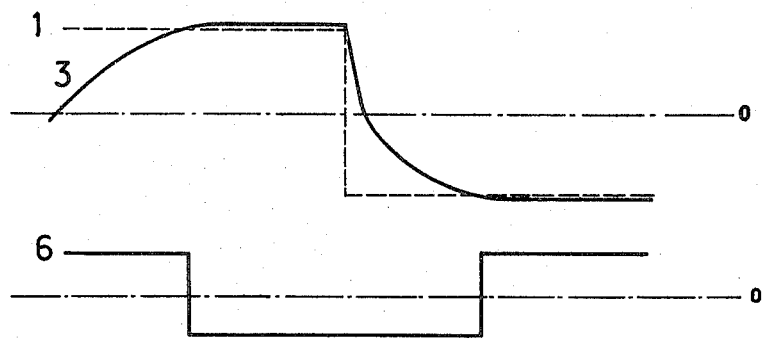

The sign of the difference arriving at input 13 of the voltage frequency converter 12 controls the order of commutation for the negative feedback loops of the amplifier 14. A potentiometer 16 is connected across the regulating terminals of the amplifier 15 for effecting the regulation to zero of the commutation point thereof. FIG. 3 illustrates the information being provided at output 6 of adder 2 for an example of a variation of the information 1 with respect to a variation of the information 3 (inverted).

At the negative input 17 of the amplifier 14, to which is connected a capacitor 18 of high capacity, the information or data 1 and 3 are added through two equal resistors 19 and 20. The positive input 21 of this amplifier is grounded through a resistor 22 and a parallel with the branch of the potentiometer 23 there is mounted a capacitor 26.

This potentiometer 23 makes it possible to regulate the threshold voltage of commutation of the amplifier 14 and to thereby adjust the dead zone corresponding to a small or low value of the difference inside of which the frequency of the converter 12 becomes zero.

The amplifier 14 is equipped with two negative feedback loops disposed between the input 17 and the common terminal 27 of the parallel combination of capacitor 28 and starting resistor 29 whose other terminal is connected to the output 25 of the amplifier 14. In addition to the common part formed of capacitor 28 and resistor 29, these two loops each comprise a pair of diodes poled in respectively opposite directions being connected between the input 17 and ground, the diodes 30 and 31 of one loop being poled in a direction opposite to the direction of the corresponding diodes 32 and 33 of the other loop. The loops are equipped respectively with gates 34 and 35; each gate may be provided in the form of an M.O.S. transistor. These gates 34 and 35 are controlled by the signal 13 in phase opposition by virtue of the inverter 36 connected in control of gate 35.

Figure 4:
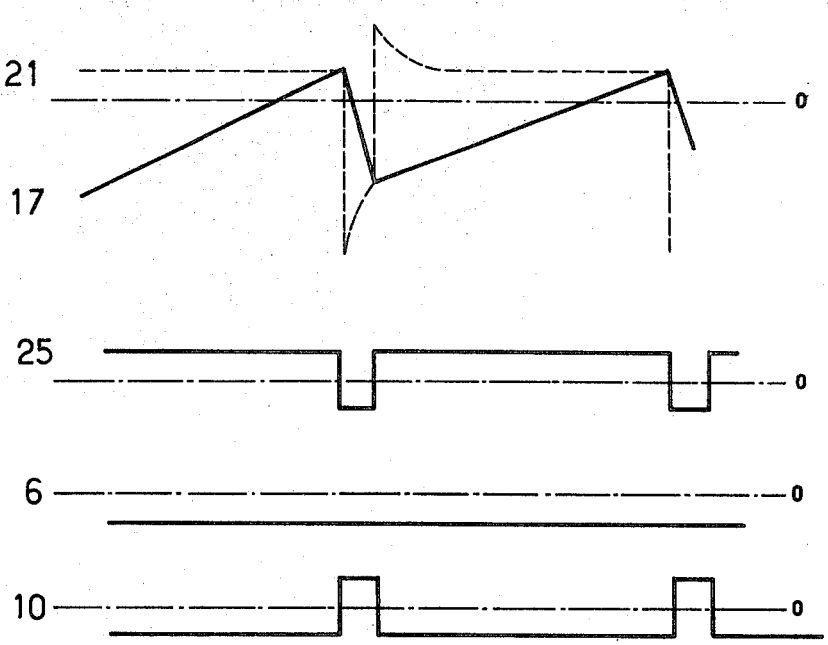

FIG. 4 represents the evolution in time of the voltages at the points 21, 17 and 25 in the circuit of FIG. 2. If the sum of the informations or data 1 and 3 is positive, the input 17 assumed to be at a negative voltage has the tendency to become positive. Under these conditions, the gate 34 is conductive and the gate 35 is blocked. When the voltage at input 17 becomes equal to or more positive than the voltage at input 21 of amplifier 14, the output 25 changes from a positive value to a negative value, which results in the discharge of capacitor 18 through the diode 30, the gate 4 and the capacitor 28, When the potential at input 17 with respect to that at input 21 becomes negative, the voltage at output 25 becomes positive. The positive pulse at output 25 is not transmitted toward input 17, but is short-circuited to ground by the diode 31. The capacitor 18 is charged through the resistors 19 and 20, and the cycle recommences. If the sum of the informations or data 1 and 3 were negative, it would be the gate 35 which would be conductive and the gate 34 would be blocked, but other-wise the operation would be analogous.

The frequency of the oscillations for the given input voltages 1 and 3 is a function of the product RC, R being determined by the resistances 19 and 20 and C being represented by the capacitor 18.

The reaction loop formed by elements 24, 23, 26, 22 makes it possible, on the one hand, to enlarge the pulses produced at output 25: on the other hand, the divider bridge 23, 24 reinjects at input 21 an adjustable voltage (when the output 25 is in a stable condition), which makes it possible to regulate the value of the minimum voltage represeative of the difference which will permit the assembly to oscilla'e.

Depending upon whether the sum of data 1 and 3 is positive or negative, negative and/or positive pulses are obtained at output 25. In certain applications, as is the case here where there is a bi-directional counter downstream of of output 25, it is necessary that the pulses be always in the same direction. This is the reason why an "exclusive OR" gate 37 has been provided to receive the pulses being provided at output 25 of amplifier 14 on the one hand and the information 6 from amplifier 15 on the other hand. The gate 37 furnishes the pulses 10 which drive the bi-directional coun4er 9. The case of an inversion of the direction of the pulses has been illustrated in the diagram of FIG. 4.

The circuit which has been described hereinabove makes it possible to obtain, when the aid of only two amplifiers, a first signal which defines the direction of the difference of two data signals and a second signal of pulses having a frequency which is variable linearly from 0 to 1 MHz.

What is claimed is:

1. An electric control system comprising adder means having a first input receiving a signal to be controlled and a second input receiving a regulation signal for providing a first signal defining the polarity of the magnitude difference between said controlled signal an: said regulation signal, a bi-directional counter responsive to said first signal and a second frequency signal for providing a digital output, digital-to-analog converter means connected to the output of said bi-directional counter for producing said regulation signal applied to said adder means, and voltage-frequency converter means responsive to said controlled signal, said regulation signal and said first signal for generating said second frequency signal, said voltage frequency converter means including a differential amplifier having one input receiving the sum of said controlled and said regulation signal, a first capacitor connected between said first input and ground, a second capacitor connected between the output of said differential amplifier and said first input thereof to form a negative feedback loop, and a potentiometer and a third capacitor connected between the output of said differnetFal amplifier and a second input thereof to form a positive reaction loop.

2. An electric control system as defined in claim 1 wherein said negative feedback loop further Includes a starting resistor connected in parallel with said second capacitor.

3. An electric control system as defined in claim 2 wherein said differential amplifier includes two negative feedback loops sharing the parallel combination of said second capacitor and said starting resistor in common, each negative feedback loop including respective oppositely poled diode means and an individual switching element, said individual switching elements being respectively actuated in accordance with the polarity of said first signal at the output of said adder means, the output of said differential amplifier being connected to said bidirectional counter.

4. An electric control system as defined in claim 3 wherein the output of said differential amplifier is connected to said bidirectional counter through an EXCLUSIVE-OR gate also receiving said first signal at an input thereof.

5. An electric control system as defind in claim 3 wherein said adder means includes an other differential amplifier having one input connected through a resistor to ground and a second input receiving the sum of said controlled signal and saId regulation signal, the output of said other differential amplifier being connected to one switching element in one feedback loop directly and to the other switching element in the other feedback loop through an inverter.

6. An electrical control system as defined in claim 5 wherein said switching elements are provided as M.O.S. transistors 7. An electrical control system as defined in claim 5 wherein said positive reaction loop Is formed by said potentiometer connected between the output of said differential amplifier and ground, the movable contact of said potentiometer being connected through a resistor to the other input of said differential amplifier and through said third capacitor to ground.

* * * * *